Aug. 11, 1959   H. I. OSHRY   2,899,345
METHOD OF MAKING TITANIUM DIOXIDE CAPACITORS
Filed March 23, 1953

INVENTOR
Howard I Oshry
BY Ralph Hammar
ATTORNEY

2,899,345
METHOD OF MAKING TITANIUM DIOXIDE CAPACITORS

Howard I. Oshry, Erie, Pa., assignor to Erie Resistor Corporation, Erie, Pa., a corporation of Pennsylvania Application March 23, 1953, Serial No. 344,023

4 Claims. (Cl. 148—6.3)

This invention is intended to produce capacitors in which the dielectric is a titanium dioxide film and the electrodes are respectively metallic titanium on one side of the oxide film and a metal coating on the other side of the oxide film. Conveniently such capacitors are made by firing a silver paint on titanium foil in an oxidizing atmosphere. During firing the silver pigment forms a coherent metallic silver coating and oxygen diffuses through the silver and forms the titanium dioxide film in situ under the silver. Because oxygen does not diffuse through gold, the terminal connection to the titanium foil can be made through a part of the titanium foil coated with gold. The other terminal connection is made direct to the metallic silver coating. Such capacitors have a flat temperature characteristic and are useful in low voltage high capacity applications.

Figure 1:
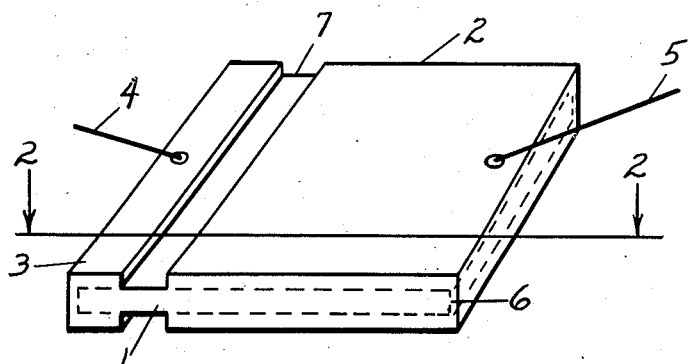
Figure 2:
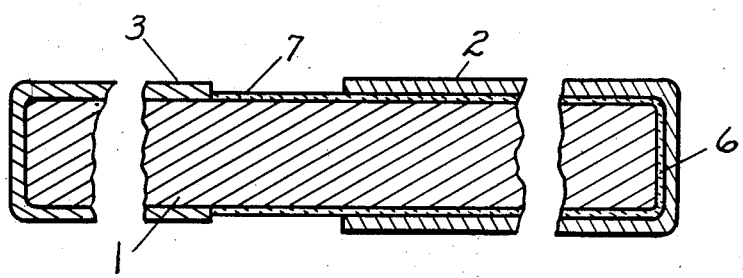
Figure 3:
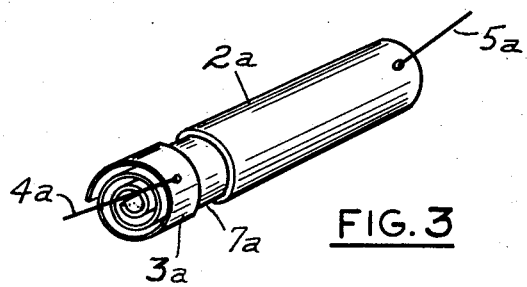

In the drawing Fig. 1 is a perspective of a capacitor, made from titanium foil; Fig. 2 is a greatly enlarged section on line 2—2 of Fig. 1; and Fig. 3 is a perspective of a capacitor in which the foil is rolled into a cylinder to reduce the bulk of the capacitor.

In Fig. 1 of the drawing is shown a flat capacitor made from a sheet 1 of metallic titanium foil which constitutes one of the condenser electrodes and having the major portion thereof covered by a metallized silver coating 2 which constitutes the other of the condenser electrodes. The terminal connection to the metallic titanium foil is made through metallized gold coating 3 to which is soldered a lead 4. The terminal connection to the metallic silver coating is made by a lead 5 soldered to the silver coating. The silver coating 2 covers the major portion of opposite surfaces of the titanium foil and the silver coatings on the opposite surfaces are connected over the edges of the film as indicated at 6.

As shown more clearly in the enlarged fragmentary section Fig. 2 the gold coating 3 is in direct metallic contact with the titanium foil 1 and there is a titanium dioxide coating 7 over the entire balance of the titanium foil and under the silver coatings 2. The titanium dioxide film 7 constitutes the dielectric so that it is necessary that the titanium dioxide film underlie the metallic silver coatings 2 and insulate the metallic silver coatings from the titanium foil 1. In the case of the gold coating 3 it is important that the gold coating be in direct metallic contact with the titanium foil so that the condenser lead 4 will make direct electrical contact with the titanium foil.

The manner in which the gold coating 3 is applied is not critical. Metallic gold may be evaporated onto the titanium foil 1. Another way of applying the gold coating 3 is to use gold paint such as used in the ceramic decorating art. These gold paints in general comprise metallic gold pigment mixed with a small amount of ceramic flux such as bismuth subnitrate, or gold resinates in suitable solvents. The gold paint is not critical. The gold paint is set to a continuous metallic film by firing during which the vehicle and binder break down and the gold pigment forms a continuous metallic film. The firing temperatures are not critical being those necessary to fuse the ceramic flux and to set the gold pigment particles together to form a continuous metallic film. The firing may be carried out in an oxidizing atmosphere because the gold is impervious to oxygen. At the end of the firing there will be a metallized gold coating 3 in direct or substantially direct metallic contact with the titanium foil 1 which will be equivalent to a gold coating formed by the evaporating technique.

The application of the silver coating 2 is likewise not critical. The silver coating may be applied by the evaporating technique. It is also possible to use the silver paints, such as used in the ceramic decorating art, which comprise a silver pigment, such as metallic silver or silver oxide and a small amount of ceramic flux such as bismuth subnitrate. As with the gold paint, the silver pigment and flux are dispersed in a vehicle which may include a temporary binder and other ingredients used in the silver paints. The silver paint is not critical. The silver paints are set by firing during which the vehicle, binder and other ingredients break down and the silver pigment particles fuse together to form a continuous metallized silver film 2.

The formation of metallized silver and gold coatings is well understood in the art and other techniques are available and have heretofore been used in the manufacture of capacitors.

Either as a part of the firing operation or as a subsequent operation the metal coated titanium foil is heated in an oxidizing atmosphere to a temperature (e.g. 300° C. to 900° C.) sufficient to oxidize the titanium. The oxide film in the space between the gold and silver coatings serves as an insulating band. No oxide film forms under the gold coating 3 which is impervious to oxygen. Under the silver coating the oxide film forms by diffusion of the oxygen through the silver and since the temperature is in a range (300°–900° C.) above the breakdown temperature of silver oxide, the silver coating is not oxidized. The oxidation process is continued until the oxide film 7 has built up to a high resistance suitable for a capacitor dielectric. Such an oxide film may have a thickness of about .0001″ resulting in a capacity of the order of .2 microfarad per square inch. The time required for oxidation depends upon the temperature, lower temperatures requiring longer times, e.g. for a temperature of 700° C., times up to 12 hours have been used. At the end of the oxidizing operation, the capacitor is completed by soldering the leads 4 and 5 to the gold and silver coatings 2 and 3.

If the coatings 2 and 3 are applied by silver and gold paints, the oxidation step will usually be part of or a continuation of the firing step. If the coatings are applied by the metal evaporation technique, the oxidation step will usually be a separate operation. It is much easier to form the oxide film in situ beneath the silver coating 2 than to apply the silver coating over a previously formed oxide coating.

As a substitute for the gold coating 3 coatings of other noble metals (except silver) may be used. The noble metals (except silver) are impervious to oxygen and soldered connections can be easily made to such metals. The resistance of the titanium dioxide coating is greatest in the direction when the titanium is positive so the capacitors should be used with the titanium (lead 4) as the positive electrode.

Instead of the flat capacitor illustrated in Fig. 1, a rolled or cylindrical capacitor may be made by rolling the metal coated titanium foil in a cylindrical shape which requires less space. Electrically the cylindrical capacitor has the same characteristics as the flat condenser and corresponding parts are identified by the same reference numerals with the subscript "a." The foil should be loosely rolled so the oxygen can readily permeate the silver coating and form the titanium oxide coating in situ beneath the silver.

The capacitors can be easily and cheaply made and have a high capacitance in a small volume with a very flat temperature characteristic. Instead of the normal temperature characteristic of titanium dioxide when the dielectric constant changes about 7½% per 100° C., the temperature characteristic of the present capacitors is very much less. The dielectric constant varies less than ½% over the range −55 to +40° C., about 1½% over the range −55 to +100° C. and about 3% over the range −55 to +130° C.

What is claimed as new is:

1. The method of making capacitors with a dielectric of titanium dioxide which comprises coating part of the area of a metallic titanium electrode with a gold coating in direct contact with the titanium, coating another part of the area of the metallic titanium electrode with a silver coating, and heating the coated titanium electrode with the coatings thereon in an oxidizing atmosphere to form a titanium dioxide film in situ under the silver coating by diffusion of oxygen through the silver.

2. The method of making capacitors with a dielectric of titanium dioxide which includes coating an electrode consisting of metallic titanium with a silver coating, and heating the coated titanium electrode with the coating thereon in an oxidizing atmosphere to form a titanium dioxide film in situ under the silver coating by diffusion of oxygen through the silver.

3. The method of making capacitors with a dielectric of titanium dioxide which comprises coating an electrode consisting of metallic titanium with a silver paint of the type reduceable by firing to a metallic silver film, and firing the coated titanium electrode in an oxidizing atmosphere to form a titanium dioxide film in situ under the silver coating by diffusion of oxygen through the silver.

4. The method of making capacitors with a dielectric of titanium dioxide which comprises coating part of the area of a metallic titanium electrode with a noble metal impervious to oxygen and in direct contact with the titanium, coating another part of the area of the metallic titanium electrode with a silver coating, and heating the coated titanium electrode with the coatings thereon in an oxidizing atmosphere to form a titanium dioxide film in situ under the silver coating by diffusion of oxygen through the silver.

References Cited in the file of this patent

UNITED STATES PATENTS

| | | |
|---|---|---|
| 1,811,603 | Ackerly | June 23, 1931 |
| 2,038,246 | Smith | Apr. 21, 1936 |
| 2,253,026 | Godsey | Aug. 19, 1941 |
| 2,334,020 | Miller et al. | Nov. 9, 1943 |
| 2,408,910 | Burnham | Oct. 8, 1946 |
| 2,504,178 | Burnham | Apr. 18, 1950 |

OTHER REFERENCES

Am. Machinist, June 11, 1951, pages 147–148.